United States Patent Office 3,720,594
Patented Mar. 13, 1973

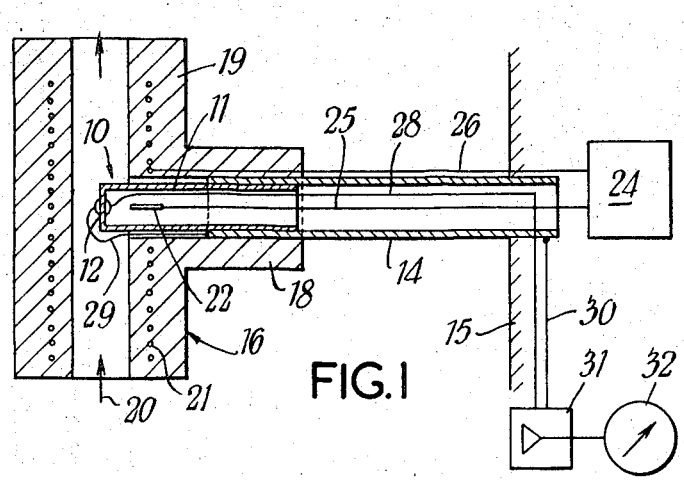
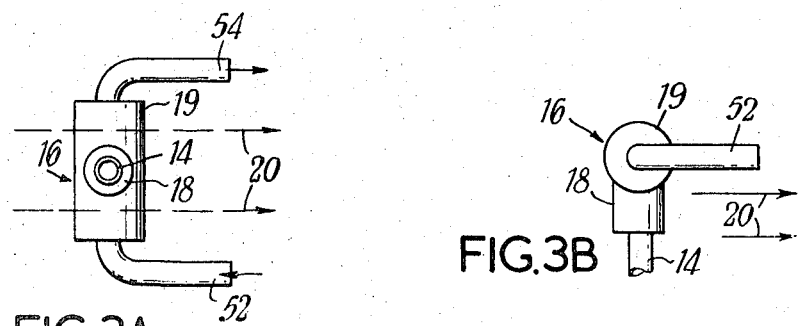
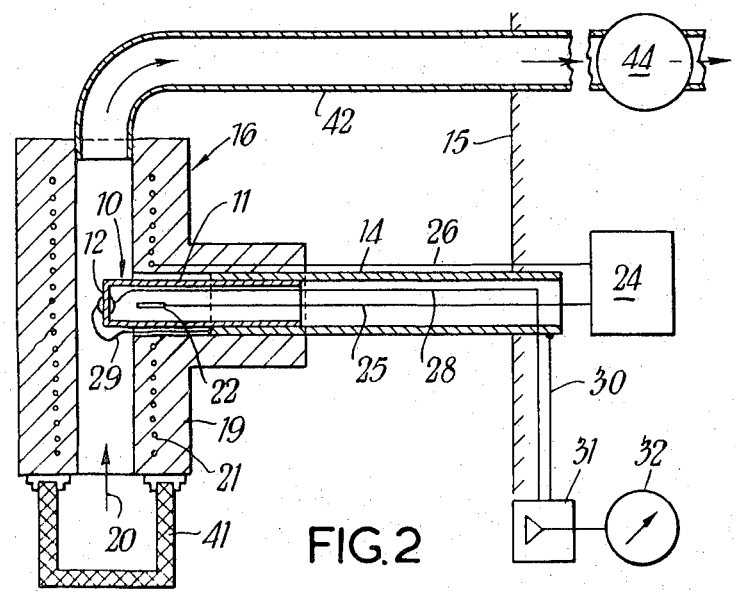

3,720,594
APPARATUS FOR MEASUREMENT OF GAS MIXTURE PROPERTIES
Haydn Wilson, Luton, England, assignor to Kent Instruments Limited, Luton, Bedfordshire, England
Filed May 4, 1970, Ser. No. 34,356
Claims priority, application Great Britain, May 9, 1969, 23,767/69
Int. Cl. G01n 27/46
U.S. Cl. 204—195 S   12 Claims

ABSTRACT OF THE DISCLOSURE

In a method of apparatus for measuring the percentage content or partial pressure of one component of a gas mixture, or for measuring the chemical potential of one component of a gas mixture, a sample flows through a sample tube incorporating the cell and located in the mixture, the sample being heated in the tube to the temperature needed for operation of the cell. The sample is caused to flow through the tube by the flow of the mixture, by convection due to the heating or by the suction of a pump.

---

The invention relates to the measurement of the percentage content or partial pressure of one component of a gas mixture or the measurement of the chemical potential of a component of a gas mixture by means of an electrochemical detector. Such measurements, as of the oxygen content of a mixture by that particular type of electrochemical detector known as an oxygen concentration cell, can provide an indication of the efficiency of a process, for example a combustion process.

Electrochemical detectors can measure directly the chemical potential of one constituent of a gas mixture, this potential being of greater significance than the partial pressure for certain solid-gas, and in particular metal-gas, reactions. The chemical potential may be defined as the partial molar free energy, or the free energy per mole, of a component of a system, the temperature, the pressure, and the number of moles of all other components of the system being kept constant. For the $i^{th}$ component of a system, it may be expressed as $$\mu_i = \left[\frac{dF}{dn_i}\right] T, P, n_j$$

For an ideal gas, this quantity is related to the partial pressure $P_1$ by the relation $$\mu_1 = \mu_1^\circ + RT \log P_1$$

where
R is the gas constant,
T is the absolute temperature; and
$\mu_1^\circ$ is the chemical potential in a standard state at 1 atmosphere pressure and the temperature T.

Suitable electrochemical detectors are described in U.S. Pat. No. 3,442,773 issued May 6, 1969 and, with particular reference to the protection of the electrodes of the detectors, in U.S. Pat. No. 3,645,875 issued Feb. 29, 1972. To enable the detector to operate, the gas temperature has to be in excess of a certain minimum, usually between about 400–500° C., and where the measurements cannot be performed on the mixture at an appropriate temperature, a sample is withdrawn from the main flow and heated for the measurement. A sampling system is therefore necessarily required.

It is the object of the present invention however to provide for the carrying out of measurements of the kind described in situ in a body of gas which is at a temperature below the minimum required by the detector.

The invention accordingly provides a method for measuring the percentage content or partial pressure of one component of a gas mixture or for measuring the chemical potential of one component of a gas mixture by exposing an electrochemical detector to a sample of the gas mixture, the method having the step of causing the sample to flow through a sample tube incorporating the cell and located in the mixture, the sample being heated in the tube to the temperature needed for operation of the cell.

The invention also provides apparatus for measuring the percentage content or partial pressure of one component of a gas mixture or for measuring the chemical potential of one component of a gas mixture, the apparatus comprising means for mounting a sample flow tube within the gas mixture for flow of a sample of the mixture through the tube, a heater for heating the sample in the tube, and an electrochemical detector positioned to be responsive to the sample.

The apparatus is located in the body of the gas mixture on which measurements are to be made, for example, in a flue through which the gas mixture flows. A portion of the gas mixture passes through the tube either as a consequence of the flow or because of convection currents due to the heater. If the rate of flow of the sample is insufficient, flow through the sampling tube can be promoted by means of an outlet tube connected to an external pump.

The invention will be more fully understood from the following illustrative description and from the accompanying drawings, in which:

FIG. 1 is a sectional side view of apparatus embodying the invention, with associated circuit elements shown schematically;

FIG. 2 is a schematic side view of a modified form of apparatus embodying the invention; and FIGS. 3A and 3B are schematic end and plan views respectively, on a smaller scale, of a second modified form of apparatus embodying the invention.

As appears from FIG. 1, an electrochemical detector in the form of an electrochemical cell 10 comprises a tube 11 with a closed end wall 12 mounted coaxially within a metal support tube 14. An electrode is secured to each side of the end wall 12, the cell corresponding generally to the cell described in U.S. Pat. No. 3,442,773. The electrodes can however be protected as described in U.S. Pat. No. 3,645,875. The closed end of the cell 10 projects out from one end of the support tube 14, the other end of which is mounted to project inwardly from a wall 15 of a flue through which is caused to flow the gas mixture on which measurements are to be made. The inner side of the end wall 12 can thus be exposed to air or to any other desired reference gas or gas mixture. The support tube 14 also carries at its free end a generally T-shaped fitting 16. The fitting 16 comprises a stem portion 18 in which is received the free end of the support tube 14 and a cross portion having its axis at right angles to that of the stem portion and constituting a sample tube or oven 19. In the arrangement shown, the axis of the oven 19 is aligned with the direction of gas flow in the flue, which is indicated by the arrow 20. The end wall 12 of the cell 10 projects into the bore of the oven 19 in the wall of which is embedded an electric heating coil 21.

The electrical arrangements of the apparatus comprise a temperature-sensitive element 22 housed within the cell 10 adjacent the end wall 12 and connected to an oven control device 24 located outside the flue by means of a lead 25. The control device is connected to the coil 21 by leads shown schematically at 26 and is arranged to effect control of the current through the coil so that the gas within the oven 19 is heated to a temperature sufficient to enable the cell to function, normally, a temperature of over 500° C. Electrical connection to the electrode on the inner side of the end wall 12 is made by a lead 28 inside the support tube 14 and connection to the other electrode is made by lead 29 within the oven forming part of a conductive path including the wall of the support tube and an external lead 30. The cell output is applied by the leads 28 and 30 to an amplifier 31 connected to a read-out device 32, outside the flue.

The orientation of the apparatus shown in FIG. 1, with the axis of the sample tube or oven vertical, in alignment with the direction of gas flow, is suitable only where the gas flow velocity is above a certain minimum. Where the gas flow velocity is below this minimum, the T-shaped fitting 16 can be re-positioned, by rotation about the axis of the support tube, so that the oven axis is normal to the direction of gas flow in the flue. The gas flow through the oven is then obtained by convection currents due to the heating of the gas within the oven.

A modification of the apparatus of FIG. 1 for dealing with slow moving, very dirty flue gases is shown in FIG. 2. The electrical arrangements and the structure of the cell 10, the support tube 14 and the oven 19 can be unchanged. The inlet end to the tubular oven is however provided with a suitable filter 41 and the outlet end is connected with a tube 42 having a right angled bend so as to extend over most of its length parallel to the support tube 14. The tube 42 extends out through the flue wall 15 to a pump 44. The gas flow within the flue is thus sampled by withdrawal of a portion through the filter 41 and the oven 19. The pump 44 can be arranged to discharge the sample withdrawn either to the atmosphere or back to the main gas flow in the flue, as preferred. As gas flow through the oven 19 is ensured by the pump 44, the orientation of the oven axis with respect to the direction of the gas flow is immaterial.

An alternative modification of the apparatus of FIG. 1, suited for use with a dirt-laden gas mixture which is flowing at high velocity, is shown in FIGS. 3A and 3B. The apparatus again comprises the T-shaped tubular fitting 16, the concentration cell 10 and the support tube 14, together with electrical arrangements as previously described. The oven 19 is positioned vertically with its axis at right angles to the flow direction, indicated by the arrow 20, so that the gas to be sampled is drawn through by convection. The entry and exhaust ends of the oven 19 are provided respectively with an inlet tube 52 and an outlet tube 54 having right angled bends so that the free ends extend away from the oven in the flow direction. Large dirt particles have enough momentum to be carried by the general flow beyond the open ends of the tubes, only fine particles being reversed in direction to enter the oven through the inlet tube 52. In some circumstances it is satisfactory to omit the outlet tube 54. The functioning of the tubes can be enhanced by suitable shaping; an example of suitable tube shaping is given in U.K. patent specification 796,010.

It will be evident that the invention provides advantageous methods and apparatus for measuring percentage content or partial pressure of a component or constituent of a gas mixture or the chemical potential of a component or constituent of the mixture. It is advantageous in particular that the sample is analysed in situ, only a small flow rate being required to maintain fast measurement response. The sample flow can be very small, so that the apparatus has a long working life and requires little maintenance. Where the sample is withdrawn from the main flow, the amounts concerned may be small enough to be charged to waste without conditioning treatment.

I claim:

1. Apparatus for measuring in situ the percentage content or partial pressure of one component of a gas mixture or for measuring the chemical potential of one component of a gas mixture, the apparatus comprising a container for the gas mixture, the container having a wall, tubular support means mounted on said wall and extending therefrom into the interior of the container, flow tube means mounted on said tubular support means within said container interior and extending transversely of the tubular support means and spaced from said wall, the flow tube means defining a flow passage having an inlet and an outlet, at least said inlet communicating with the container interior, an electrochemical detector having a first electrode thereof exposed to gas mixture in said flow passage and a second electrode exposed to a reference gas in the interior of said tubular support means, and electric heating means mounted on the flow tube means to heat the gas mixture flowing in the flow passage past said first electrode of the electrochemical detector.

2. Apparatus according to claim 1 in which said container comprises an elongated conduit for guiding a flow of said gas mixture, and in which said flow passage extends lengthwise of said conduit.

3. Apparatus according to claim 2 in which said flow passage extends along the axis of said conduit.

4. Apparatus according to claim 1 in which the flow passage extends vertically, whereby the gas mixture flows in the flow passage by convection currents due to heating by said heating means.

5. Apparatus according to claim 1 in which the container comprises an elongated conduit for guiding a flow of the gas mixture and in which the flow passage extends vertically and transversely of the conduit axis, whereby the gas mixture flows in the flow passage by convection currents due to heating by said heating means.

6. Apparatus according to claim 5 having inlet tube means carried by said flow tube means and extending from the flow passage inlet, said inlet tube means having a right angled bend and an inlet end portion open to the conduit interior and extending parallel to the conduit axis in the direction of flow within the conduit.

7. Apparatus according to claim 6 having outlet tube means carried by the flow tube means and extending from the flow passage outlet, said outlet tube means having a right angled bend and an outlet end portion open to the conduit interior and extending parallel to and in the direction of the inlet tube means inlet end portion.

8. Apparatus according to claim 1 in which the electrochemical detector comprises a tube having a wall closing one end thereof, and first and second electrodes on opposite sides of said end wall, said detector tube extending from said tubular support means through an aperture in the flow passage wall to expose said first electrode to gas in the flow passage.

9. Apparatus according to claim 8 in which the flow tube means comprises a T-shaped fitting, the flow passage extending along the arms of the fitting and the stem of the fitting being tubular to define said aperture.

10. Apparatus according to claim 1 in which the electric heating means comprises a heating coil around said flow passage, a temperature responsive element located within the tubular support member adjacent said second electrode, and means for controlling the current supply to the coil in dependence on the temperature responsive element.

11. Apparatus according to claim 1 having a suction pump located outside of the container, and an outlet tube extending from the flow passage outlet to said pump.

12. Apparatus according to claim 1 having a filter carried by the flow tube means, said inlet communicating with the container interior through the filter.

References Cited

UNITED STATES PATENTS

| | | | |
|---|---|---|---|
| 2,311,976 | 2/1943 | Coleman | 204—195 |
| 2,744,061 | 5/1956 | De Ford et al. | 204—195 |
| 3,024,174 | 3/1962 | Stetson | 204—241 |
| 3,317,410 | 5/1967 | Croll et al. | 204—239 |
| 3,329,599 | 7/1967 | Brewer | 204—195 |
| 3,434,953 | 3/1969 | Porter et al. | 204—195 |
| 3,442,773 | 5/1969 | Wilson | 204—1 T |
| 3,481,855 | 12/1969 | Kolodney et al. | 204—195 |
| 3,514,377 | 5/1970 | Spacil et al. | 204—195 |
| 3,546,086 | 12/1970 | Sayles | 204—195 |

TA-HSUNG TUNG, Primary Examiner

U.S. Cl. X.R.

204—1 T